United States Patent
Westrick, Jr. et al.

(10) Patent No.: US 10,054,919 B2
(45) Date of Patent: Aug. 21, 2018

(54) INTEGRATED LIGHTING AND BUILDING MANAGEMENT CONTROL GATEWAY

(71) Applicant: ABL IP HOLDING LLC, Conyers, GA (US)

(72) Inventors: Richard L. Westrick, Jr., Social Circle, GA (US); Nathaniel Christopher Herwig, Lawrenceville, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 90 days.

(21) Appl. No.: 15/220,758

(22) Filed: Jul. 27, 2016

(65) Prior Publication Data
US 2017/0364046 A1 Dec. 21, 2017

Related U.S. Application Data

(60) Provisional application No. 62/352,735, filed on Jun. 21, 2016.

(51) Int. Cl.
G05B 13/00 (2006.01)
G05B 15/02 (2006.01)
(Continued)

(52) U.S. Cl.
CPC .......... *G05B 15/02* (2013.01); *H04L 12/2816* (2013.01); *H05B 37/0245* (2013.01)

(58) Field of Classification Search
CPC .................................................... G05B 15/02
See application file for complete search history.

(56) References Cited

U.S. PATENT DOCUMENTS 8,035,320 B2 10/2011 Sibert
8,731,689 B2 5/2014 Platner et al.
(Continued)

OTHER PUBLICATIONS

"Sensorswitch Design Guide and Catalog: nLight Control System," published by Sensorswitch, Wallingford, CT, "http://www.sensorswitch.com/literature/nlight.sub.—catalog.pdf", pp. 1-64, specifically see "Network Access Functionality" on p. 24. Apr. 2, 2013 in U.S. Pat. No. 8,731,689 (64 pages).
(Continued)

*Primary Examiner* — Vincent Tran
(74) *Attorney, Agent, or Firm* — RatnerPrestia

(57) ABSTRACT

The examples herein offer an improved, more integrated implementation of lighting control and building management control, e.g. within the same gateway or cloud computing/control element(s), via an integrated software architecture. A visualization platform of the software architecture provides an integrated user interface via network communication of the computing element with a user terminal device. The integrated user interface offers the user an integrated view of status of building automation control (BAC) appliances and luminaires within the premises, as well as integrated access to control operations of the BAC appliances and the luminaires. For example, the overall system of integrated lighting and building management control may offer a 'single pane of glass' type user interface for lighting and other managed operations in the premises. Also, the architecture may utilize a broker for publish-and-subscribe communications, for exchange of information between lighting and building management application and with the visualization platform.

19 Claims, 7 Drawing Sheets

(51) Int. Cl.
    *H04L 12/28*     (2006.01)
    *H05B 37/02*     (2006.01)

(56) References Cited

U.S. PATENT DOCUMENTS

| | | | |
|---|---|---|---|
| 2012/0136485 A1 | 5/2012 | Weber | |
| 2014/0303788 A1* | 10/2014 | Sanders | F24F 11/0009 |
| | | | 700/276 |
| 2014/0358285 A1 | 12/2014 | Aggarwal et al. | |
| 2015/0109095 A1 | 4/2015 | Soucy et al. | |
| 2015/0113507 A1 | 4/2015 | Soucy | |
| 2016/0091217 A1* | 3/2016 | Verberkt | G06F 8/665 |
| | | | 700/276 |
| 2016/0212831 A1* | 7/2016 | Dobai | H05B 37/0272 |
| 2016/0370258 A1* | 12/2016 | Perez | G01M 99/00 |
| 2017/0244792 A1* | 8/2017 | Yin | H04L 67/125 |

OTHER PUBLICATIONS

Distech Controls: "EC-gfxProgram," copy obtained by Feb. 9, 2016 (6 pages).

Distech Controls: "It's Time You Experienced Eclypse," © Distech Controls Inc. 2014, copy obtained by Feb. 4, 2015 (16 pages).

Distech Controls: "Meet the New Standard in Sustainable Buildings," © Distech Controls Inc. 2010, copy obtained by Feb. 3, 2015 (28 pages).

Distech Controls: "Innovative Solutions for Greener Buildings," © Distech Controls Inc. 2015, copy obtained by Mar. 5, 2016 (15 pages).

Distech Controls: "Building Management Solutions for Data Centers and Mission Critical Facilities," © Distech Controls Inc. 2014, copy obtained by Mar. 5, 2016 (8 pages).

\* cited by examiner

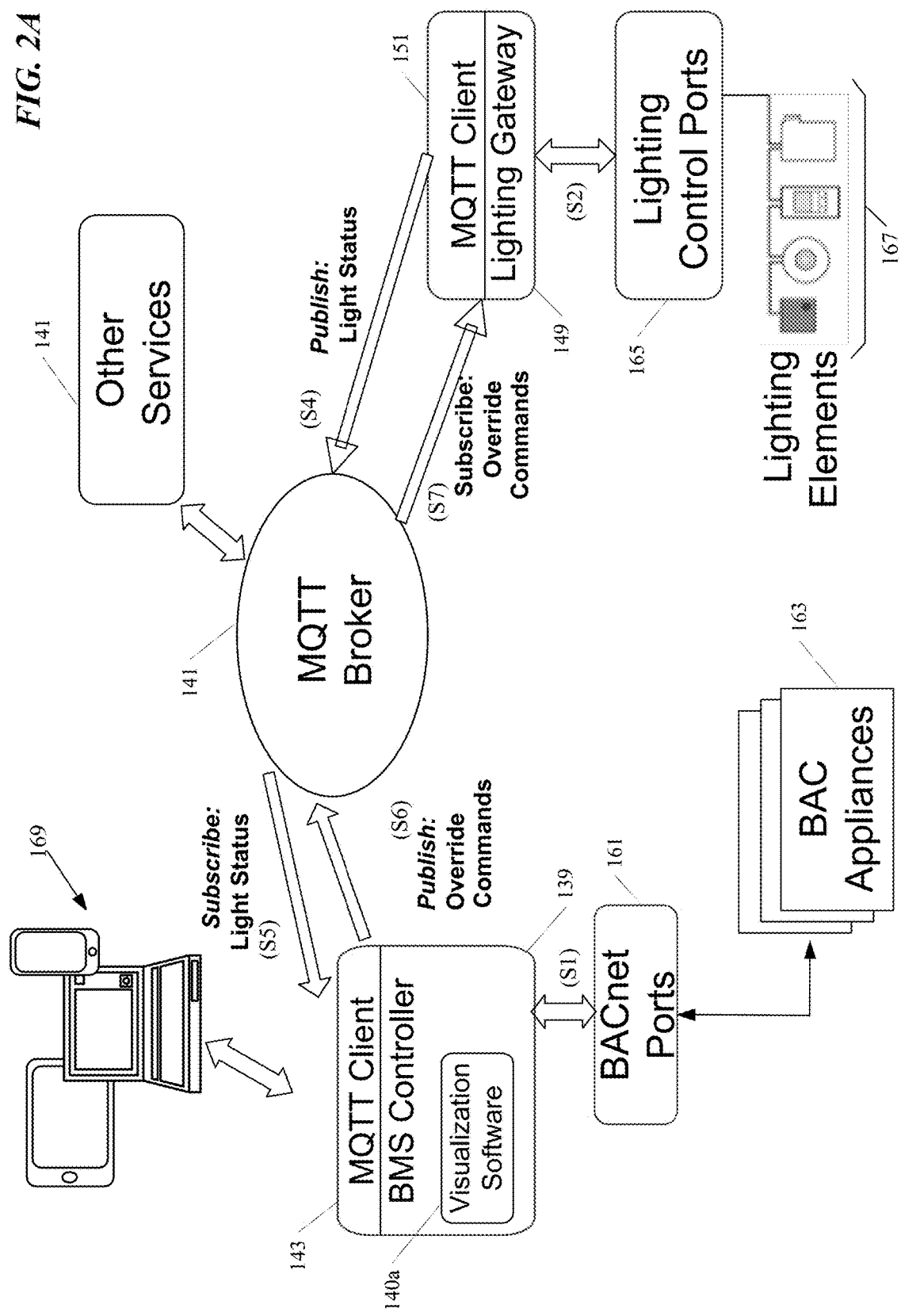

INTEGRATED LIGHTING AND BUILDING MANAGEMENT CONTROL GATEWAY

RELATED APPLICATIONS

This application claims the benefit of U.S. Provisional Application No. 62/352,735, filed Jun. 21, 2016 entitled "INTEGRATED LIGHTING AND BUILDING MANAGEMENT CONTROL GATEWAY," the disclosure of which also is entirely incorporated herein by reference.

TECHNICAL FIELD

The present subject matter relates to technologies to implement an integrated gateway functionality, both for lighting control and building management control.

BACKGROUND

In recent years, the sophistication of lighting control systems have increased significantly, for example, offering lighting scene, profile or schedule manipulation for individual lighting devices, groups of lighting devices or all lighting devices at a controlled premises. Depending on the technology of the luminaires control functions may include simple ON/OFF control, intensity control (e.g. dimming) and even control of color characteristics (e.g. for tunable white luminaires or the like). Building automation control (BAC) systems or building management systems (BMS) also have improved in the sophistication of the ability to reach every unit item or controllable appliance at the premises, offer informative, intuitive access to information and readily customizable control operations for every appliance on the premises that is adapted for BAC or BMS type networked monitoring and control functions.

The two different types of control systems typically have been implemented from and optimized for two different perspectives, lighting control and building automation control. Many, standalone lighting control systems have had little or no ability to control other types of equipment, such as heating, ventilation and air conditioning (HVAC) components, door access controls, fire and safety equipment, on-premises surveillance equipment, etc. Building automation control or management systems typically control these other types of on-premises equipment; and although such building control systems typically offer some degree of lighting control, the lighting control capabilities have been much more limited than those of fully featured dedicated lighting control systems.

There have been attempts to combine a lighting control system and a building management system for use managing automation within a premises. Although referred to as premises, for convenience, these systems often are applied across multiple buildings and geographies. Current solutions use BACnet (standardized building automation control network) or similar high-level interfaces to exchange a limited amount of lighting data and building management system data, which in turn limits the ability of the two diverse control systems to exercise meaningful control over one another. Only simple, system-level status and control capabilities are available.

Hence a need exists for better integration between lighting control and building control or management systems.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 2A and 2B are functional diagrams of two somewhat different examples, each including several components of the software architecture for the integrated control and some system elements interfacing with a gateway implementation.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Various examples disclosed herein relate to a control methodology for lighting and building management and to an integrated software platform for a gateway or a cloud implementation of the integrated lighting control and building management control. Examples described below also encompass systems utilizing such a gateway or cloud functionality for integrated control as well as various appliances, lighting devices, etc. that communicate or otherwise interact with or through the gateway or cloud based integrated control functionality.

Figure 1:
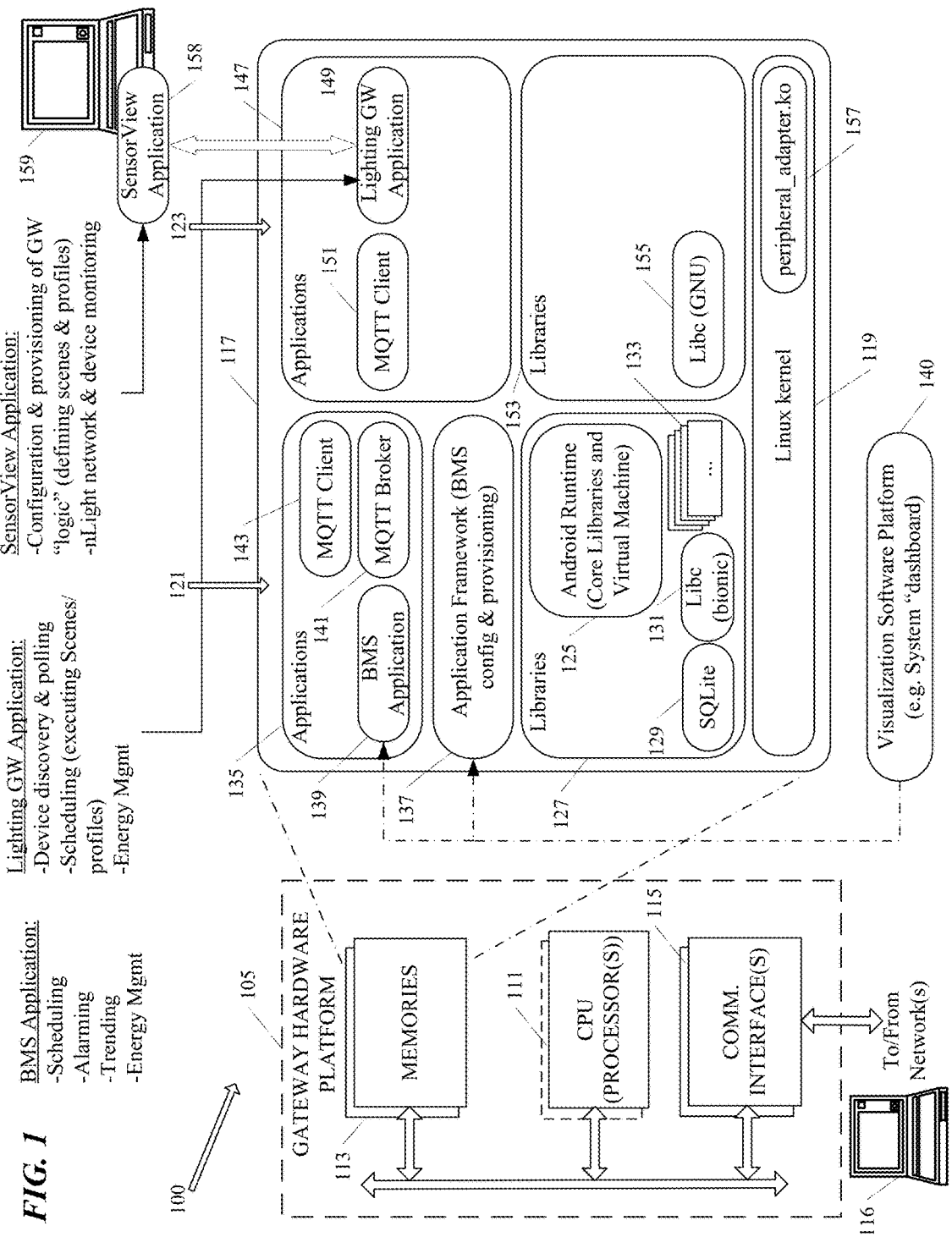
FIG. 1 is a high level block diagram illustrating an example of the hardware platform of a computing element and the software architecture of programming for the computing element, for implementing integrated lighting control and building management control, e.g. as a gateway or in the cloud.

Reference now is made in detail to the examples illustrated in the accompanying drawings and discussed below. FIG. 1 illustrates an example of the hardware platform of a computing element and the software architecture of programming for implementing integrated lighting control and building management control. The integrated control functionality may be implemented on a computing element located/configured to act as a gateway to the system(s) of lighting elements and building management control elements at one or more premises. Alternatively, some or all of the integrated control functionality may be implemented in the cloud, e.g. on a distributed basis running as a software implemented services on a number of host or server type computers connected to communicate via the Internet or another appropriate data communications network.

For convenience of discussion and illustration, FIG. 1 shows a gateway hardware platform as the implementation of the computing element. Such a gateway may be located at the premises where the lighting elements and building control appliances are to be monitored and/or controlled via the integrated functionality or at a location having access to network(s) that provide communication with the lighting elements and building control appliances at the relevant premises. Although the premises may be a single property and associated building structure, the term premises is used in the examples to also encompass applications of the hardware and the monitoring and control software to more than a single site or building, such as campus. In an on-site gateway type implementation, user access from an on or off-premises network is via the gateway. Those skilled in the art should understand that the integrated control functionalities and related software architecture discussed below with regard to the gateway type hardware platform are readily adaptable to a cloud service type implementation on one or more network connected computing elements.

Hence, FIG. 1 shows an example of a gateway 100 for integrated lighting and building management control. The drawing shows a hardware platform 105, which is an example of a computing element that may be used to implement the gateway 100. The drawing shows the hardware platform 105 in a high level block diagram form. For example, the intelligence of the gateway 100 relies on one or more processors 111 acting as a central processing unit (CPU) of the hardware platform 105. Software, including the gateway and related control program, any other programming, as well as data processed by or to be supplied to/from the CPU, is stored in appropriate storage devices, represented in the examples by memories 113. Although referred to collectively as memories, examples of suitable memories include semiconductor memory devices for read only memory (ROM), random access memory (RAM), solid-state drives (SSDs) and solid-state memory cards, cache memory and the like, as well as other storage technologies such as magnetic or optical disk or tape drives, etc. The memories 113 in the gateway platform 105 are examples of non-transitory machine readable media that may bear the software for execution by the processor(s) 111 acting as the CPU of the gateway 100. Other examples of suitable media for bearing the software are described later.

The gateway hardware platform 105 includes one or more network interfaces 115. The network interface(s) 115 provide the gateway 100 communication coupling/connection for communication to and from equipment within the premises monitored and/or controlled at least in part through the gateway 100. The network interface(s) 115 also provide the gateway 100 communication coupling/connection for communication to and from user terminals 116 or 159 and any other equipment that may use monitoring data or send configuration or control commands to or through the gateway 100. The user terminals and any other such equipment may be within the premises or outside the premises, and as such, may communicate with the gateway via local network(s) or via external networks (e.g. the Internet, a secure Intranet, or other wide area network).

Internally the elements of the gateway hardware platform 105 are coupled or connected together for exchange of data and/or instructions by any suitable communication media, shown for convenience as a bus arrangement (represented by arrows) in FIG. 1. The term "coupled" as used herein refers to any logical, physical or electrical connection, wired or wireless link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

The gateway hardware platform 105 may be implemented by a general purpose computer with suitable processing and memory capacities and appropriate network connectivity; or the gateway may be implemented on a specific, purpose built hardware platform. Although represented as a single hardware device, the computing element may be formed of any number of computer-based hardware platforms running the appropriate integrated control software architecture, e.g. on a distributed basis. More detailed examples for implementing the hardware platform 105 of the gateway 100 are discussed later, for example, with respect to FIGS. 6 and 7.

FIG. 1 also illustrates an example of the software architecture 117 programming for execution on the gateway hardware platform 105 for implementing integrated lighting control and building management control, e.g. the functions of the gateway 100. The software architecture 117, in the example, includes a Linux kernel 119 for execution on a processor 111 of the hardware platform 105. Linux is used as the basic programming platform or operating system for this example, although other operating systems or environments may be used for that layer. Although not separately shown, the Linux kernel 119 includes various device drivers that allow the software architecture 117 to control, monitor, communicate and interact through the various hardware components of the particular platform 105 or the like forming the computing element.

The example of the software architecture 117 uses two programming stacks 121 and 123. The stack 121, to the left in the illustrated example, represents programming for a number of general/overall gateway functions as well as building management control functions. The program stack 123, to the right in the illustrated example, implements some general gateway functions as well as lighting control centric functions.

In the Linux based example of the software architecture 117, the stack 121 includes an Android runtime environment 125 for execution via the Linux kernel 119, shown as part of the libraries 127. Other libraries include an SQLite library 129, a Libc (bionic) library 131 and any number of other ad hoc libraries 133.

In this example, applications in the layer 135 of the stack 121 interact through an application framework 137, for use of the libraries 127 and for execution through the Linux kernel 119. In the example, the applications layer 135 of the stack 121 includes a building management system (BMS) application 139, for execution via the application framework 137 on the Android runtime environment 125. The applications layer 135 of the stack 121 also includes a Message Queue Telemetry Transport (MQTT) broker 141 and a MQTT client 143 for execution via the application framework 137 on the Android runtime environment 125. As discussed more later, the stack 123 also includes a MQTT client and other software components may utilize the MQTT communications.

MQTT is a lightweight client/server messaging protocol based on a publish-and-subscribe interaction rather than client-request and server-deliver model. With the publish and subscribe model, a client publishes information to the MQTT broker. Published information from a client is identified under one of a number of 'topics,' and other clients subscribe to the relevant topic and receive the information from the broker when the information is newly published or updated. In this way, clients are able to publish data items they "know about," and clients are able to subscribe to data "known about" by other clients. In particular, the clients can subscribe specifically to those "topics" that are relevant to their own operation.

MQTT or other types of publish-and-subscribe protocol communications offer relatively generic information transfer and do not impose particular constraints. For example, the generic data sharing via MQTT or the like mitigates the need if any for protocol data aggregation and transfer, to enable communications between devices or programs that otherwise may communicate via different protocols. Also, such data sharing via a publish-and-subscribe protocol like MQTT facilitates implementation either on a standalone computing element, e.g. configured as an actual or physical gateway, as well as implementation in the cloud.

The BMS application 139 is configured to support network communications with building automation control (BAC) appliances within a premises, such as in one or more buildings and any associated outdoor space at a site or campus, to monitor and/or control the BAC appliances. The term "BAC appliances" here is used as a general term for various devices that can be monitored and/or controlled by the building management functionality of the system 100. A specific example uses a building management communication protocol referred to as BACnet, and specific examples of BAC appliances may be configured to communicate using the BACnet protocol; however, the appliances are not limited to BACnet compliance and may be implemented in other ways, e.g. that communicate using other protocols. As discussed more later, examples of BAC appliances include sensors and controllable elements of a heating, ventilation and air conditioning (HVAC) system, security and access control components at the premises, closed circuit television equipment at the premises, fire or safety alarm systems, and the like. Although some lighting and related control elements could be configured as and controlled like BAC appliances, for purposes of the present example, light and related elements are treated and controlled differently via the stack 123, as discussed later. As discussed more later, the MQTT broker and associated clients provide data transfer that is relatively agnostic with respect to differences in protocols used for or by different applications, such as the BMS application 139 and the lighting gateway application 149.

The BMS application 139 implements a variety of functions optimized for monitoring and control of BAC appliances. Although the BMS application 139 may support a variety of other functions, the example shown at 139 in FIG. 1 supports scheduling, alarm detection and reporting, data accumulation and processing for trending analysis, and energy management with respect to the various appliances associated/communicating with the BMS application 139. For its BMS functions, the BMS application 139 may communicate with the appliances in a native building management protocol, such as BACnet. Of course, other building management centric, proprietary, or non-building management related protocols may be used.

The BMS application 139 also supports user interface functions at least with respect to the associated BAC appliances, by inclusion of or interaction through a visualization software platform 140, e.g. which provides the integrated system dashboard or the like. Although shown separately, for convenience, the visualization software platform 140 is a component of the software architecture for integrated lighting and building management control 117. The dot-dash arrows from the visualization software platform 140 serve as examples showing that the visualization software platform 140 platform may be implemented in the BMS application 139 or as a component of the application framework 137. The visualization software platform 140, for example, may be an HTML5 web-based graphic design and visualization interface type web application. Such a web application may be used to create and view interfaces ranging from those for a single equipment to a complete building management interface. Those skilled in the art should appreciate that the visualization software platform 140 may be implemented in other ways and/or places in the software architecture 117, e.g. as a component of the application layer 147 of the stack 123 or as a remote application which utilizes data accumulated by the BMS application 139 or the application framework 137.

The application framework 137 includes a lower layer framework for the BMS application 139 to implement the actual monitoring and control functions of the BAC appliances, e.g. of the mechanical components of an HVAC system or the like, albeit through the drivers implemented in the Linux kernel 119. For example, the application framework 137 includes one or more components to enable the application 139 to configure and/or provision BAC appliances. Examples of framework components within 137 includes a webserver, window manager, content provider(s), viewer system, package manager, telephony manager, resource manager, location manager and notification manager.

MQTT broker 141 receives information for publication and makes published information available to subscribers, in this example, utilizing MQTT as the particular type of publish-and-subscribe protocol. The role of the MQTT broker 141 is to facilitate connections to clients, to manage lists of data publishers and associated subscribers, and to notify subscribers when new data is published. The publish-and-subscribe broker 141 is "agnostic" regarding the actual data being exchanged. In the example, the MQTT broker 141 is a component of the application layer 135 of the building management stack 121. For example, the MQTT broker 141 in the illustrated example is configured for execution via the application framework 137 on the Android runtime environment 125. The MQTT broker 141 or other type of publish-and-subscribe broker could be deployed in other ways or places in the software architecture 117, for example, in the application framework 137 or in the application layer 137 of the stack 147.

The application layer 135 of the building management stack 121 also includes an MQTT client 143 associated with the BMS application 139. The MQTT client 143 may be a component of the BMS application 139 or a separate application layer client program. In an implementation as a separate application, as in the illustrated example, the MQTT client 143 is configured for execution via the application framework 137 on the Android runtime environment 125. The MQTT client 143 supports publish-subscribe communications between the BMS application 139 with the MQTT broker 141. For some examples, the BMS application 135 may be configured to publish lighting related override commands using the MQTT client 143 via the MQTT broker 141 and to subscribe to lighting related status messages via the MQTT client 143 and the MQTT broker 141. This configuration may enable the BMS application to directly communicate with the lighting stack components, such as the application 149, without involvement of the visualization software platform or a user. This communication configuration may also support the user integrated interface, for example in an arrangement in which the visualization software platform is implemented as a component of the BMS application 139 and therefore utilizes some publish-and-subscribe exchanges regarding lighting with application 149 via the MQTT client 143 and the MQTT broker 141.

The software architecture 117, in the example, also includes the lighting related stack 123, which similarly includes applications in the layer 147. In the example, the applications 147 include a lighting and gateway (GW) control application 149 for execution via the Linux kernel 119. The lighting and gateway (GW) control application 149 implements a variety of functions optimized for monitoring and control of illumination related functions of a number of luminaires at the premises. Although the lighting and gateway (GW) control application 149 may support a variety of other functions, the example shown at 149 in FIG. 1 supports lighting control, device discovery, control device polling, scheduling and executing lighting scenes/profiles, and energy management. For its lighting-related monitoring and illumination control functions, the lighting and gateway (GW) control application 149 may communicate with the luminaires and other lighting related elements (e.g. wallswitches, control panels, dimmers, relays, ambient light sensors, occupancy sensors, etc.) in a native lighting control protocol, such as the protocol used in the nLight® networked digital lighting control system. The protocol of the nLight® system may utilize Ethernet over CAT-5 cable or WiFi (IEEE 802.11). Of course, other lighting centric or non-lighting related protocols may be used.

The lighting and gateway (GW) control application 149 together with the luminaires and other lighting related elements may support a variety of general illumination and ancillary services, such as room illumination scheduling, lighting scene definition/control, mobile positioning, asset tracking and management, people tracking, etc.

Many of the functions of building management relate to set-point monitoring/control, e.g. to detect a temperature and control HVAC equipment over time based on relationship(s) of the detected temperature to one or more temperature set-points or thresholds. In comparison, many of the lighting related functions require relatively immediate real time changes of state of the controlled luminaires, e.g. to turn a luminaire or group of luminaires ON/OFF fast enough to appear instantaneous to a person having just activated a wallswitch or control panel or entering a dark/unoccupied room.

The applications in the layer 147 also includes a MQTT client 151 for execution via the Linux kernel 119. The MQTT client 151 supports publish-subscribe communications between the lighting and gateway control application 149 with the MQTT broker 141. For example, the lighting and gateway (GW) control application 149 is configured to publish the lighting related status messages based on the monitoring of the luminaires and/or other lighting related system elements within the premises via the MQTT client 151 and the MQTT broker 141, and to subscribe to the lighting related override commands via MQTT client 151 and the MQTT broker 141. The MQTT broker 141 can run on an identified computer, such as a computer at the premises configured as a physical gateway; or the MQTT broker 141 can run as a cloud service (on network connected hardware offering software based services from the cloud).

The publish-and-subscribe communications via the MQTT broker 141 also extend to the visualization software platform 140. As noted, the visualization software platform 140 may be implemented as part of the BMS application 139, in which case, the communications for the visualization software platform 140 would utilize the MQTT client 143. Alternatively, the visualization software platform 140 may be implemented as part of the application framework 137, in which case, the visualization software platform 140 may have an MQTT client in associated therewith or incorporated therein.

The publish-and-subscribe communications via the MQTT broker 141 between the BMS application 139, the lighting and gateway control application 149 and the visualization software platform 140 enable data sharing amongst those software architecture components and/or exchanges of overrides or other commands amongst some or all of those software architecture components. The publish-and-subscribe communication supports integrated user interface functions through the visualization software platform 140 yet allows some decoupling and supports associated optimization of potentially divergent monitoring and control functions of the BMS application 139 and the lighting and gateway control application 149. The communication approach in the example also transcend changes to lower-level software architecture elements (e.g., the CHROOT environment) as the software architecture 117 evolves.

The example represents an implementation of the stack 123 which need not involve a full port of a prior standalone implementation of the lighting related software from base Linux previously used to host the lighting gateway application to the Android variant of base Linux. The example of stack 123 instead takes advantage of an OS-level virtualization technology available under Linux known as CHROOT. Alternative or future implementations of the stack 123 could use Android and/or an application framework analogous to those in the stack 121.

With the parallel stack and application approach illustrated by way of example in the drawing, each application 139 or 151 may have data/files for communication with and monitoring and control of the respective equipment, including in types formats optimized for the different building management and lighting related functions. For example, data objects for the monitored or controlled lighting elements are stored in a native format associated with lighting control, whereas data objects for the monitored or controlled BAC appliances are stored in a native format associated with building management (e.g. as BACnet objects, if using BACnet protocol and the like).

The lighting and gateway (GW) control application 149 also supports user interface functions. Many of the user interface functions are implemented through the integrated user interface that the system 100 offers via the visualization software platform, for example, so that lighting related user interface functions are available via the system dashboard or the like along with the building management related user interface functions, e.g. in a 'single pane of glass' type user control interface for lighting and other managed operations in the premises. The single "pane of glass" is a reference term used to describe a common user experience across multiple building subsystem human-machine interfaces (HMIs)—a single visualization environment where aspects of various subsystems can be systematically represented in a common graphical user interface (GUI).

In the example, the stack 123 also includes libraries 153 for use by the applications 147, although the drawing shows only one library 153, in this example, a Libc (GNU) library 155. The Libc (GNU) library components, in the example, may be two different versions of C/C++ programming libraries (commonly-called system, I/O, data, and file management operations). Bionic is a more compact version than GNU and is commonly used in the Android environment.

In the example, the Linux kernel 119 includes a peripheral_adapter.ko 157. The peripheral_adapter.ko 157 is an example of a device driver, which in this example enables the gateway platform to perform I/O to and from the Lighting Control ports. As discussed more with respect to later drawings, one example of a system implementation is nLight® enabled; and in such an example, the nLight® ports are physically RS-485 serial ports which are virtualized over an Ethernet link between the controller hardware and an interface referred to later as a "sidecar" (see e.g. FIG. 4).

In the example, the BMS application 139 is configured to support network communications with building automation control (BAC) appliances within a premises, for example, to monitor and/or control the BAC appliances. The lighting and gateway control application 149 is configured to support network communications with luminaires and other lighting related elements within the premises, to monitor and control the luminaires and to monitor the other lighting related elements.

The BMS application 139 is configured to use MQTT client 143 to publish and subscribe via the MQTT broker 141. Depending on the implementation, the BMS application 139 may configured to publish lighting related override commands via MQTT client 143 to the MQTT broker 141. The BMS application 139 also may be configured subscribe to lighting related status messages via the MQTT client 141 from the MQTT broker 141. These lighting related publish-and-subscribe communications may enable BMS application 139 to monitor lighting related activity and/or to control lighting related operations in relation to other BMS functions (without user involvement). Alternatively or in addition, these lighting related publish-and-subscribe communications may support the integrated user interface functionality of the visualization software platform 140, in an implementation where the BMS application 139 includes the visualization software platform 140. If provided separately, the visualization software platform 140 itself may have similar publish-and-subscribe communications capabilities regarding lighting related commands and/or lighting related status messages. The separate implementation of the visualization software platform 140 may have similar publish-and-subscribe communications capabilities for communications with the BMS application 139.

Conversely, the lighting and gateway control application 149 is configured to publish the lighting related status messages based on the monitoring of the luminaires and/or other lighting related elements within the premises, via the MQTT client 151 to the MQTT broker 141 (for consumption by a subscribing BMS application 139 and/or a subscribing visualization software platform 140). The lighting and gateway control application 149 also is configured to subscribe to the lighting related override commands via the MQTT client 151 from the MQTT broker 141 (as published by BMS application 139 and/or the visualization software platform 140). Communications thus are exchanged between the lighting and gateway control application 149 and the BMS application 139 and/or the visualization software platform 140 via the MQTT broker 141 and any respective MQTT clients using a publish-and-subscribe procedure.

The visualization software platform 140 provides the user interface for the integrated control offered by the system 100. Depending on the implementation of the visualization software platform 140, it may offer an integrated user interface via network communication of the hardware platform 105 with a user terminal device. Alternatively, software for the integrated user interface functionality is configured elsewhere, e.g. as one or more separate components in the application framework 137. In an example, this integrated user interface offers the user an integrated view of status of the BAC appliances, the luminaires and the other lighting related elements within the premises. The example of the integrated interface also offers the user integrated access to control operations of the BAC appliances and the luminaires within the premises.

As noted earlier, the visualization software platform 140 provides an integrated user interface, e.g. as an integrated system dashboard or the like. The visualization software platform 140, for example, may be an HTML5 web-based graphic design and visualization interface type web application. Such a web application may be used to create and view interfaces ranging from those for a single piece of equipment to a complete building management interface. Those skilled in the art should appreciate that the visualization software platform 140 may be implemented in other ways.

In our example, the visualization software platform 140 is the environment for creation and delivery to the user of the user experience with respect to the building management and control via the system 100. The visualization software platform 140, in an example, offers a graphical user interface (GUI) for establishing control algorithms for appliances 163 and lighting devices under control of the system 100, for defining profiles of appliances 163 or lighting elements 167, to create desired data views, for reviewing status or other information about monitored appliances 163 or lighting elements 167, or the like. Depending on the implementation of the platform, the visualization software 140 may also provide an application development environment for the lighting and building management functions. Creation/development operations may be supported, for example, using a drag-and-drop functionality supported by the visualization software platform 140. These user interface capabilities apply in a unified fashion both to building management (e.g. to monitoring and control of BAC appliances) and to lighting (e.g. to monitoring and control of lighting elements, like luminaires, sensors, switches, controllers, etc.). In this way, the visualization software platform 140 offers a 'single pane of glass' type user interface for building management and lighting in the premises.

The visualization software platform 140, in the example, allows the unified user interface to scale to a variety of different user terminal devices, such as a computer, a tablet or a smartphone or other handheld portable device. The visualization software platform 140 can run on an identified computer, such as a computer at the premises configured as a physical gateway; or the visualization software platform 140 can run as a cloud service (on network connected hardware offering software based services from the cloud). In either implementation, the visualization software platform 140 in the example provides a web based access, which appears in a browser on a user's terminal device. In such a case, the user need not have specialized software installed on their terminal device.

An example of the system 100 utilizes nLight® type networking and software for much of the lighting control functionality. Working in conjunction with the lighting gateway application 149, SensorView® is a software package distributed for configuring and maintaining an nLight® type lighting control network. It is a web application built on the .NET framework and enables discovery of gateway devices, display of connected devices (network view), and configuring gateway profiles. Profiles are defined as a group of nLight® commands that can be applied to a group of devices. For example, a profile might tell a group of lights to dim to 50%. Profiles may be scheduled by SensorView®. Many of the lighting control functions available in the lighting-centric SensorView® application are implemented via the software architecture 117 for integrated building management and control. In some implementations, however, it may be useful to include an interface between a SensorView® application 158 on a computer 159, with direct communication access to the lighting and gateway (GW) control application 149.

The SensorView® application 158 would be installed on a computer 159 acting as its host system, such as a laptop or a PC in a building's control room. The application 158 uses a TCP/IP port to communicate with the lighting and gateway (GW) control application 149. This TCP/IP communications of the SensorView® application 158 could be routed through a webserver implemented in various locations in programming stacks 121 or 123. In an another alternative, the functions of the application 158 could be implemented as part of the integrated user interface supported by the visualization software platform in the stack 121.

Other lighting control technologies and software could be used in place of or in combination with the nLight® and SensorView® components discussed here by way of examples.

The software architecture 117 in the example uses a highly customizable publish-and-subscribe communication framework to connect multiple diverse system elements/applications in a predictable way, providing a standardized data model to allow the system elements/applications to share status and control information, while allowing them to continue to provide highly specialized functionality for the specific purposes they serve.

As noted earlier, MQTT and similar protocols provide relatively generic data transfer mechanism and impose few if any constraints on the types of information or how the transferred information is used. For example, building management related information need not conform to a building management protocol and lighting information need not conform to a lighting-centric protocol. An application or the like with information to share, merely publishes the information on a particular topic via the client and broker, and a set of applications or the like can consume that information in the way that is suitable to the subscriber application(s). Each subscriber application that attaches via the broker can determine which if any of the data published on a particular 'topic' to consume and how to respond to that selectively consumed data in accordance with the subscriber application's own purposes/criteria. For example, the operations of the BMS application 139 in processing/responding to information that the BMS application 139 consumes can be optimized for building management criteria, and the operations of the lighting and gateway (GW) control application 149 in processing/responding to information that the application 149 consumes can be optimized for lighting criteria.

As a result, the BMS and lighting related functionalities are more readily merged, e.g. while mitigating the need for specialized adaption of either to operate with the other or the attendant comprise or degradation of the performance of one or the other functionalities engendered by such specialized adaption. For example, the BMS application 139 can communicate with BAC appliances in the appropriate building management protocol, and the lighting application 149 can communicate with lighting elements in the appropriate lighting protocol. The BMS application 139 need not support the lighting protocol, and the lighting application 149 need not support the building management protocol. However, the BMS application 139 can consume, react to and further distribute lighting related information shared by the lighting application 149 in a manner optimized for its BMS functions; and the lighting application 149 can consume, react to and further distribute information shared by the BMS application 139 in a manner optimized for its lighting related functions. For example, the BMS application 139 might use information obtained from a topic it is subscribed to, such as data from an occupancy sensor (that luminaires or the application 149 use to turn on light in a room), to turn ON or OFF ventilation of the room or to modify a set-point of an HVAC system.

Figure 2B:
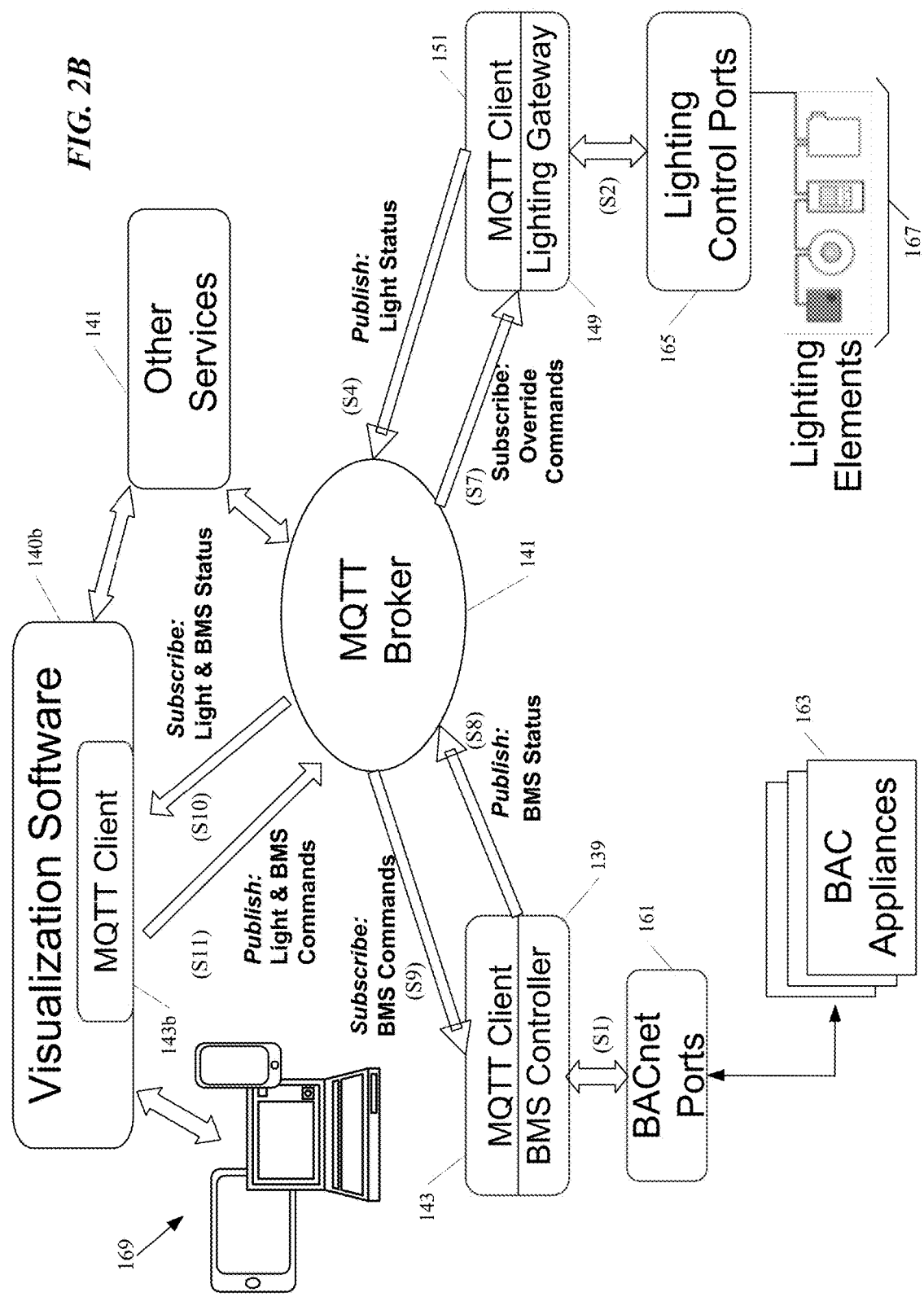

FIGS. 2A and 2B are functional diagrams of two somewhat different examples, each including several components of the software architecture for the integrated control and some system elements interfacing with the gateway, for reference in a somewhat more detailed discussion below of the information sharing in our example. A number of elements and steps are common to both examples and will be referenced together in the descriptions that follow.

FIGS. 2A and 2B both show the BMS application (also labeled "Controller") 139 connected for two-way communication (step S1) through ports 161 with BAC appliances 163. The ports 161 may be physical interface ports such as Ethernet, BACnet or the like; and/or the ports 161 may be logical ports. As noted earlier, the BMS application 139 monitors and/or controls the BAC appliances shown in FIGS. 2A and 2B at 163. Some BAC appliances 163 (e.g. sensors and other input devices) may be monitored, some BAC appliances 163 may be controlled, and some BAC appliances 163 are both monitored and controlled. For these purposes, the two-way communications (step S1) enable the BMS application 139 to receive status and possibly other information from monitored BAC appliances 163 and to send control commands and possibly configuration files/data to controlled BAC appliances 163, using the building management centric communication protocol.

In a similar fashion, the lighting and gateway (GW) control application 149 is connected for two-way communication (step S2) through ports 165 with various lighting elements 167. The ports 165 may be physical interface ports such as Ethernet ports, RS-485 ports or the like; and/or the ports 165 may logical ports. As noted earlier, the lighting and gateway (GW) control application 149 monitors and/or controls the lighting elements 167. Some lighting elements 167 (e.g. sensors, wallswitches and other input devices) may be monitored, some lighting elements 167 may be controlled, and some lighting elements 167 (e.g. luminaires) are both monitored and controlled. For these purposes, the two-way communications (step S2) enable the lighting and gateway (GW) control application 149 to receive status and possibly other information from monitored lighting elements 167 and to send control commands and possibly configuration files/data to controlled lighting elements 167, using the lighting centric communication protocol.

FIGS. 2A and 2B also show the MQTT clients 143, 151 and the MQTT broker 141. Here, the clients 143, 151 are shown as integrated into the respective applications 139, 149, although the clients 143, 151 could be separate programs/modules in communication with the respective applications 139, 149.

These two drawings also show the visualization software. To support user interface functions with full two way access to all information and control functions of the system, the visualization software also communicates via publish-and-subscribe communications and the MQTT broker 141. FIGS. 2A and 2B show two different types of deployments of the visualization software. In FIG. 2A, the visualization software 140a is implemented as part of the BMS controller application 139. In the alternative illustrated in FIG. 2B, the visualization software 140b is a separate software component.

As outlined earlier, the publish-and-subscribe communications via MQTT may support communications between applications without concurrent user interaction or requiring communication to/from the visualization software. The publish-and-subscribe communications via MQTT also support input and output for the integrated user interface functionality of the visualization software.

In the first case (FIG. 2A), the visualization software 140a uses the MQTT client 143 for its publish-and-subscribe communications, for appropriate communications to/from the application 149 on the lighting side. The visualization software 140a also works with other components of the BMS application 140a for its status monitoring and control related functions relative to BAC appliances 163 under control of the BMS controller application 139, In the example of FIG. 2B, the visualization software 140b has its own MQTT client 143b available to or included in (as shown) the visualization software 140b, for appropriate communications to/from the application 149 on the lighting side. Hence, the visualization software 140b may communicate directly via publish-and-subscribe communications and the MQTT broker 141, in a manner similar to the communications of the BMS application 139 and the lighting and gateway (GW) control application 149.

From the lighting side perspective, the lighting and gateway (GW) control application 149 publishes status information (step S4) about the lighting elements 167 and/or about the application 149 itself, via MQTT client 151 and MQTT broker 141. The published lighting status information is available to other system components that subscribe to the relevant lighting topics. The BMS application 139, in the first example of FIG. 2A, subscribes to the relevant lighting topics; therefore, the BMS application 139 receives lighting related status information from the broker 141 when such information is newly published or updated (step S5). In that example, the lighting status information from S5 is available for direct BMS action (e.g. to operate ventilation or modify and temperature set-point based on occupancy sensing for lighting purpose). The lighting status information from S5 also is available for use by the visualization software 140a, e.g. for integrated reporting purposes.

Continuing with the FIG. 2A example, for lighting control purposes, the BMS application 139 publishes lighting related override commands (step S6) via MQTT client 143 and MQTT broker 141. These commands may be generated as part of the BMS functionality, e.g. as part of a BMS control routine such as enabling lights when scheduled to turn up HVAC at a time shortly before expected occupancy.

Hence, the BMS application 139 may programmatically generate the override commands, e.g. in response to events resulting from a control algorithm or process running in the BMS application 139. With the included visualization software 140a, the published commands alternatively may relate to new user inputs via the integrated user interface functionality. In this later case, the BMS application 139 may receive user instructions, from a terminal device 169 via the visualization software 140, that cause the BMS application 139 to relate corresponding lighting related override commands via publish-and-subscribe communications.

The lighting and gateway (GW) control application 149 subscribes to relevant lighting topics (step S7) published via the broker 141. As a result, the lighting and gateway (GW) control application 149 receives lighting related override commands from the broker 141 when such information is newly published or updated (step S7). The application 149 processes the override commands and changes its state or sends lighting protocol instructions to one or more of the lighting elements 167, in accordance with the configuration settings/programming of the lighting and gateway (GW) control application 149.

As an alternative or addition to these communications between the applications 139 and 149 and/or platform 140, the lighting control application and/or the visualization software platform may be configured to subscribe to BMS related status messages and publish BMS related commands via the broker 141. In such an example, the BMS application 139 would be configured to publish the BMS related status messages based on the monitoring of the BAC appliances within the premises via the client 143 and the broker 141 and to subscribe to the BMS related commands via the client 143 and the broker 141.

In FIG. 2B, several of the steps, particularly S1-S4 and S7 are similar to steps discussed above relative to FIG. 2A. In FIG. 2B, the BMS application 139 publishes BMS related status (step S8) and subscribes to BMS related commands (step S9), using its client 143 and the broker 141. Although the status information and commands transferred from and to the BMS application 139, the communications may be implemented in a fashion otherwise similar to earlier examples.

Although not shown for convenience, the BMS application 139 may subscribe to lighting status and publish lighting related override commands as in the FIG. 2A example for direct interaction with the lighting side similar to that discussed above. Alternatively, the lighting gateway application could subscribe to BMS status messages and publish BMS override commands.

In a fashion similar to the applications 139, 149, the visualization software 140b subscribes to the relevant lighting topics and BMS topics to receive the lighting related status information from the broker 141 when the information is newly published or updated (step S10). Processing of the consumed lighting or BMS related status information is determined by the programming and/or configuration the visualization software 140b. For example, the visualization software may provide a unified report/display that includes or reflects the lighting related status information and the BMS related status information for a user of one of the terminal devices, examples of which are shown at 169 in FIG. 2.

In a fashion similar to the applications 139, 149, the visualization software 140b publishes commands (step S11) the broker 141, for example, in response to new user inputs via the integrated interface supported by the visualization software 140b. In this case, the commands published in step S11 may relate to lighting operations and be intended for subscription/consumption by the application 149, or for BMS operations and be intended for subscription/consumption by the application 139.

The discussion above focused on communications related to lighting and control and user interface functions regarding lighting through the visualization software 140, the BMS controller application 139 and the lighting gateway (GW) application 149. The resources and publish-and-subscribe communications, however, are available for other services 171, for a variety of other service applications.

As discussed earlier, the software architecture for integrated lighting and building management control utilizes a publish-and-subscribe type communication procedure. The specific example implements data exchange via publish-and-subscribe communications using MQTT. Communication among disparate components involves exchange of a number of different types of message. Although message definitions may be established for various purposes, by way of example, it may be helpful to consider a sample of a data design for exchanging data between the lighting and gateway (GW) control application 149 and the BMS application 139 and/or the visualization software platform 140 (if separate from the application 139).

Using MQTT as a specific example for the publish-and-subscribe type communication procedure, MQTT clients publish or subscribe data in the form of "topics." A topic is a UTF-8 string, which is used by the broker 141 to filter messages for each connected client. A topic consists of one or more topic levels. Each topic level is separated by a forward slash (topic level separator). An individual topic resembles a directory path (thinking in terms of file system). Clients may take advantage of wildcards (single level or multi-level). This capability can simplify subscribing to a more generalize set of topics, which will help in this implementation to aggregate communication regarding multiple devices of the same general type.

In our example of the MQTT data exchanges to/from the lighting and gateway (GW) control application 149, examples of major categories of data to exchange (topics) are shown in table 1, which follow.

TABLE 1

Lighting Related MQTT topics

| Topic Type | Description |
| --- | --- |
| Lighting Device Status | topics that a client would subscribe-to to be notified of lighting device status changes |
| Lighting Device Info | topics that a client would subscribe-to to retrieve lighting device properties |
| Lighting Device Control | topics that the lighting GW application 149 would subscribe-to to allow a client to control a lighting device's settings. |
| Lighting Gateway Status | topics that a client would subscribe-to to be notified of status changes of the lighting GW application 149. |
| Lighting Gateway Configuration (read) | topics that a client would subscribe-to to retrieve the configuration settings the lighting GW application 149. |
| Lighting Gateway Configure (write) | topics that the lighting GW application 149 would subscribe-to to allow a client to configure configuration settings of the lighting GW application 149. |
| Lighting Profile-Schedule Status | topics that a client would subscribe-to to retrieve lighting profile-schedules and their current state. |
| Lighting Profile Control | topics that the lighting GW application 149 would subscribe-to to allow a client to run/stop a lighting profile-schedule. |

Of course other data designs/definitions may be used for the publish-and-subscribe communications between the components of the software architecture 117.

Figure 3:
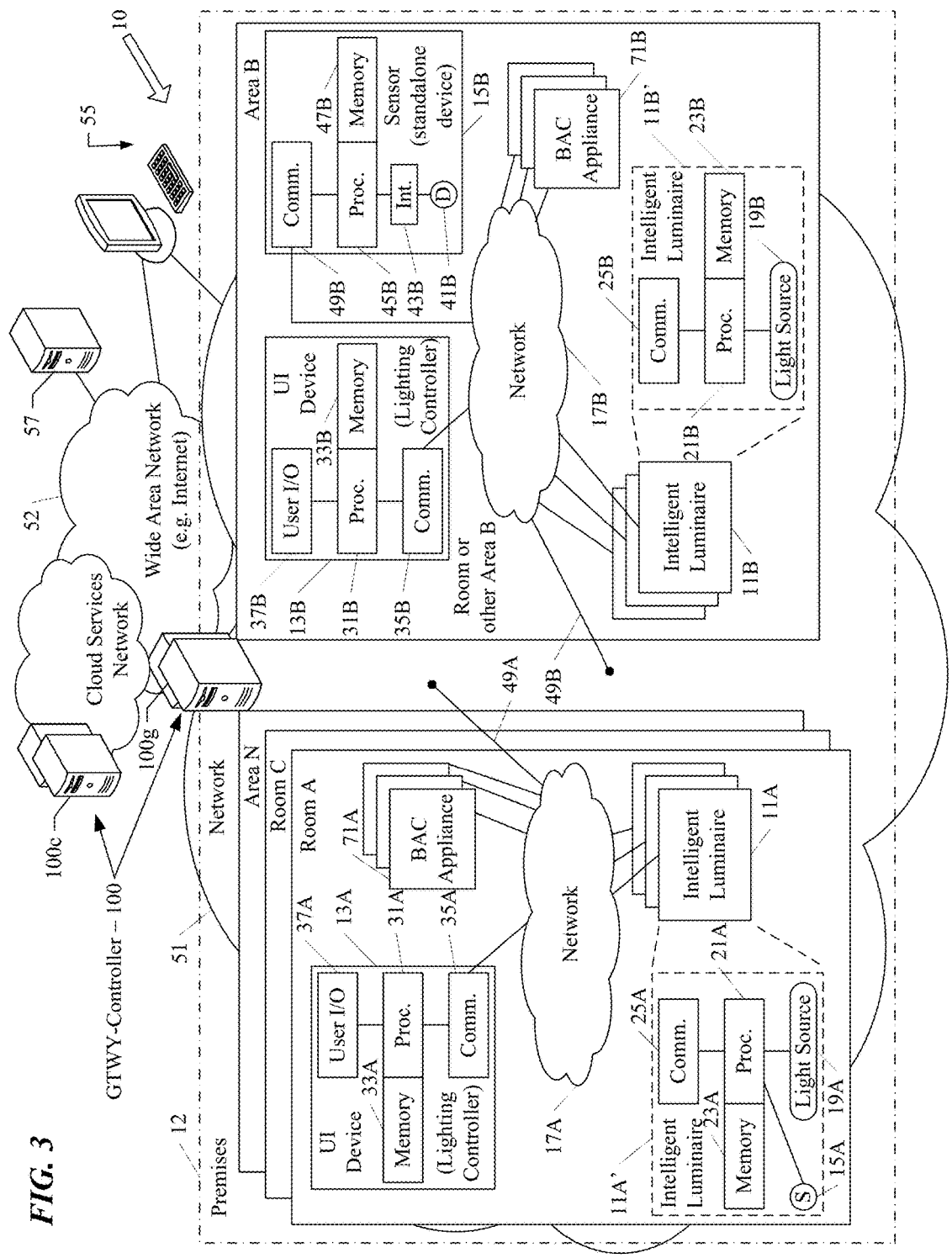
FIG. 3 is a functional block diagram of a simple example of a networked system of lighting related equipment and building automation control (BAC) capable appliances as well as one or more computer elements that may offer integrated lighting and building management control.

The system 100 and its software architecture 117 for integrated monitoring, control and user interface (FIGS. 1 and 2) may be in communication and operate in a variety of ways, with various appliances configured for building management system control and various luminaires and other lighting related elements configured for interaction with the lighting application. It may be helpful to consider an example of a deployment of system 100 in somewhat more detail. For that purpose, FIG. 3 is a high-level block diagram of a simple example of a networked system 10 of lighting related equipment and building automation control (BAC) enabled appliances as well as two example implementations of the of a gateway 100 for integrated lighting and building management control. One implementation is in the form of a hardware platform serving as an actual network gateway 100g at the premises 12. The implementation is in the form of a cloud service 100c available from one more network connected computers.

The premises 12 may be any location or locations serviced for integrated lighting and building management control utilizing a gateway 100 of the type described here. Most of the examples discussed below focus on building installations, for convenience, although the system may be readily adapted to outdoor installations or properties encompassing indoor and outdoor areas. Hence, the exemplary system 10 provides lighting and building management control services in a number of service areas A to N in or associated with a building, represented by room A and room or other service area B, and generally by other room C and service area N. Examples of other types of service areas include a corridor a building and an outdoor area associated with a building. Further examples of indoor service areas include storage areas, stairwells, etc., whereas further examples of outdoor service areas include parking, path, roadway, area, etc.

The system 10 in this example utilizes a variety of intelligent system elements, including intelligent implementations of luminaires and other lighting related elements (e.g. user interface devices, sensors, etc.) as well as intelligent implementations of building automation control (BAC) appliances.

For lighting, the system 10 may include any number of luminaires 11A, such as fixtures or lamps, as well as or other lighting related elements, such as lighting controllers (e.g. switches, dimmers or smart control panels) or sensors (e.g. of occupancy, daylight or ambient light). For other functions that are automated at the premises, the system also may include any number BAC appliances, such as BAC appliances for: HVAC, security systems, building access systems, fire or safety alarm systems, access control or commercial systems, as well as associated user input devices and/or sensors. The intelligent system elements incorporate a processor or the like implementing a central processing unit (CPU) function, programming for the CPU, and network communication capabilities.

A lighting control and building management system such as 10, which utilizes many intelligent elements, has considerable inherent processing and memory capacity. Many tasks can be performed by each element utilizing the element's own internal processor, memory programming and configuration/setting data. For example, a luminaire will be able to receive and appropriately process a lighting command (e.g. to set a light level, to set an associated color characteristic(s) of the device's light source, focus and/or aiming of the light output, etc.) to adjust its operational light output as commanded, from another lighting element, often without the need for immediate instructions from the lighting application 149 in the gateway 100. The luminaire, however, will report status to the lighting application 149 and adjust its operations in response to commands from the lighting application 149 (e.g. to implement an operation schedule). A user interface (UI) device configured as a lighting or building management controller will be able to send commands to a luminaire or to a controlled BAC appliance it controls; and a sensor will be able to report its sensed condition to any system elements configured to receive and utilize such information. Like the luminaire, however, user interface device and/or sensor will report status to the lighting application 149 or to the BMS application 139, as appropriate, and may adjust its operations in response to commands from the lighting application 149 or the BMS application 139.

In our illustrated example, each room or other type of service area controlled by the system 10 includes a number of intelligent luminaires and may include one or more BAC appliances. The intelligent luminaires are shown and described by way of examples (only) in which the processors, communications interfaces, etc. are included within the luminaires. It should be understood, however, that the light generation in the luminaires may be separated from the processors that control the lighting and/or the network interfaces that provide the communication capabilities. For example, a luminaire may include a light source and connect to an associated power pack or other control device that includes the processor controlling the source operations and the applicable interface for network communications. Some areas may also include system elements such as one or more user interface devices configured as a lighting controller or as a controller type BAC appliance. Some service area may include one or more standalone sensors configured to control lighting or as a sensor/control element type BAC appliance.

As shown in FIG. 3, the service area represented by room A in the example includes an appropriate number of first luminaires 11A, for example, to provide a desired level of lighting for the intended use of the particular space in room A. Room A also includes one or more first BAC appliances 71A, which may, for instance, regulate the temperature in room A or control access to room A. In a similar fashion, the equipment in room or other service area B in the example includes an appropriate number of second luminaires 11B, for example, to provide a desired level of lighting for the intended use of the particular space in area B. Room B also includes one or more second BAC appliances 71B, which may, for instance, regulate the temperature in room B or control a refrigeration unit in room B.

For convenience, the drawing shows other lighting related elements, such as user interface (UI) devices and standalone lighting related sensors. Although not separately identified, some of the BAC appliances in the example will be or have integrated therein UI device components and/or appropriate sensors.

Hence, the illustrated equipment in room A also includes a lighting related user interface (UI) device or lighting controller 13A. In a similar fashion, the equipment in service area B also includes a user interface (UI) device, which in this example, serves as a second lighting controller 13B. Examples of UI devices that may be used are discussed in more detail later.

Although some service areas may not include a sensor, the equipment in each of the service areas A and B includes one or more lighting-related sensors, although the sensors in these two examples are implemented in somewhat different ways. In room A, the sensor 15A is an element of one or more of the luminaires 11A. In room B, the sensor 15B is implemented as a standalone system component. Such sensors may detect a condition that is relevant to lighting operations, such as occupancy, ambient light level or color characteristics of light in an area or level or color of light emitted from one or more of the luminaires 11A or 11B serving the particular area.

Other sensors implemented in a BAC appliance or as a standalone BAC appliance may detect other conditions that are relevant to other functions of the system 10 or for more general communication about conditions in an area for still further purposes. Examples of other conditions that sensors may detect include temperature or humidity for HVAC control, vibration for reporting of earthquakes or similar events, fire, smoke or gas detection, sound for user input or for detection of breakage or the like, as well as window or door state for security or access control. Other examples of conditions that may be detected by appropriate sensors include power monitoring, an object/occupant identification, etc. Different sensors for different types or sets of conditions may be relevant in different system installations, e.g. some of these examples might be more relevant in warehouse type system applications than in retail or residential settings. For purposes of further discussion of FIG. 3, we will focus on implementations that include sensors for purposes related to lighting control and building management operations, as integrated via the gateway 100 of the type described above.

The luminaires 11A, the lighting controller 13A, the sensor 15A (if provided in one of the intelligent devices 11 A) and the BAC appliances 71A are located for service of the first area, that is to say, for controlled lighting and other building management functions within room A in the example. Similarly, the luminaires 11B, the lighting controller 13B, the sensor 15B (if provided) and the BAC appliances 71B are located for controlled lighting and other building management functions within the second service area, in this case, in room or other type of area B.

The equipment in room A, in this example, the luminaires 11A, the lighting controller 13A, the BAC appliances 71A and the sensor 15A in one of the luminaires 11A, are coupled together for network communication with each other through data communication media generally represented by the cloud in the diagram to form a first physical network 17A. Similarly, the equipment in second area B, in this example, the luminaires 11B, the lighting controller 13B, the BAC appliances 71B and the sensor 15B, are coupled together for network communication with each other through data communication media generally represented by the cloud in the diagram to form a second physical network 17B. The media for lighting control and for building management may be physically separate media, as in some other illustrated examples (FIGS. 1 and 4), or the physical media may be the same yet use different logical channels media (e.g. different virtual networks). As discussed more later, this networking also supports communications with the gateway 100 and thus with applications 139, 149 in the software architecture 117, including the visualization software 140.

Many installations will include equipment for providing lighting control and building management services in a similar manner in other rooms and/or other types of services areas within or on a particular premises 12, such as in a building or indoors and outdoors about a campus or the like. Although not shown, in similar detail, such other service areas are represented generally by room C to area N in the example illustrated in FIG. 3.

Although the intelligence of one or more luminaires may be implemented in a separate module or power pack, the example of system 10 utilizes intelligent luminaires, that is to say, lighting devices that themselves incorporate the central processing unit and communication element(s). Hence, each luminaire has a light source, a processor, a memory and a communication interface, in the system diagram. By way of an example, one of the luminaires 11A is shown in expanded block diagram form, as represented by the dashed line box at 11A'. As shown by that expanded example, each device 11A in room A includes a light source 19A, a processor 21A, a memory 23A and a communication interface 25A. In service area A, at least one of the luminaires 11A' includes the sensor 15A, as well. The drawing also shows one of the luminaires 11B' in expanded block diagram form. As shown at 11B', each luminaire 11B includes a light source 19B, a processor 21B, a memory 23B and a communication interface 25B. Although the communication interfaces 25A, 25B are shown communicating via lines, such as wired links or optical fibers; some or all of the interfaces 25A, 25B may use wireless communications media such as optical or radio frequency wireless communication. Also, although the examples in FIG. 3 show each of the luminaires having one communication interface, some or all of the luminaires 11 may have two or more communications interfaces to enable data communications over different media with the network(s) and/or with other devices in the vicinity.

The lighting related sensors also have associated intelligence and communication capabilities. In the example of room A, the intelligence and communication capabilities associated with the sensor 15A are those of the host luminaire 11A'. In the example of room or other service area B, the sensor 15B is a standalone device incorporating its own associated intelligence and communication capabilities, as will be discussed in more detail, later.

The UI devices serving as the lighting controllers in this example also are implemented as smart/intelligent devices with processing and communication capabilities. Hence, each lighting controller 13A, 13B includes a processor, a memory and a communication interface, as well as one or more input and/or output elements for physical user interaction. As shown by way of example, the UI device serving as lighting controller 13A in room A includes a processor 31A, a memory 33A and a communication interface 35A. The UI device serving as lighting controller 13A also includes one or more user input and/or output elements represented generally by user I/O element 37A in the drawing. The element 37A, for example, may include a toggle switch, one or more push button switches, a rotary controller, one or more sliders, a keypad, various indicator lights, haptic feedback components, and/or a touchscreen display.

A touchscreen display, for example, may support touch and touch gesture input as well as visual display output. Other examples of the UI input may include a video input and associated processing for gestural control detection, a microphone, an occupancy/motion sensor, proximity sensor, etc. Outputs may be visual, audible, tactile, etc. For example, a microphone and/or speaker may be used to support audible input and/or output, whereas a camera in combination with projector or display may be used to support visual input and/or output. As shown by way of example, the UI device serving as lighting controller 13B in service area B includes a processor 31B, a memory 33B and a communication interface 35B. The UI device serving as lighting controller 13B also includes one or more user input and/or output elements represented generally by user I/O element 37B in the drawing. The element 37B, for example, may be similar to the I/O element 37A in UI device 13A, examples of which were discussed earlier. Of course, other elements may be used to receive input from and/or provide output to a user, in any of the UI devices/controllers 13A, 13B.

Like the luminaires, the communication interface systems of the UI devices may utilize one or more interfaces to support data communication of the UI devices over the available/appropriate media at the premises 12. For example, although the communication interfaces 35A, 35B are shown communicating via lines, such as wired links or optical fibers; some or all of the interfaces 35A, 35B may use wireless communications media such as optical or radio frequency wireless communication. Also, although the examples in FIG. 3 show each of the UI devices having one communication interface, some or all of the UI devices 13A or 13B may have two or more communications interfaces to enable data communications over different media with the network(s) and/or with other devices in the vicinity.

As outlined earlier, in the example of FIG. 3, any sensors included in the system 10 also have or are associated with intelligence and communication capabilities. The sensor 15A is integrated into a luminaire; and the processor, memory and communication interface of that device provide the intelligence and communication capabilities associated with that sensor 15A. The sensor 15B, however, is a standalone device and includes its own individual intelligence and communication capabilities.

The sensor 15B includes a physical condition detector (D) 41B, which is the actual device that is responsive to the particular condition to be sensed. The detector 41B may receive a drive signal; and in response to the sensed condition, the detector 41B produces a signal having a characteristic (e.g. voltage magnitude) that is directly related to a characteristic level of the sensed condition. The sensor 15B also includes a detector interface circuit (Int.) 43B. The circuit 43B provides any drive signal that may be needed by the particular device type of physical condition detector 41B. The detector interface circuit 43B also processes the output signal from the detector 41B to produce a corresponding output, in a standardized data format, for use by the associated intelligence. The integrated sensor 15A in luminaire 11A may be implemented by a detector and interface circuit analogous to the physical condition detector 41B and the detector interface circuit 43B.

The standalone implementation of a sensor 15B also includes a processor 45B and an associated memory 47B. The sensor 15B also includes a communication interlace 49B, typically similar to or complimentary with the interfaces 25B and 35B used by other devices 11B or 13B in the particular service area B. Like the luminaires and/or UI devices, the communication interface systems of any standalone sensors may utilize one or more interfaces to support data communication of the standalone sensor devices over the available/appropriate media at the premises 12.

In the examples of FIG. 3, the luminaires, UI devices and standalone sensors are shown as having one processor, for convenience. In many instances, these devices may have multiple processors. For example, a particular device configuration may utilize a multi-core processor architecture.

Also, some of the other components, such as the communications interfaces, may themselves include processors. Alternatively, the processor and associated memory in any or all of these elements may components of a Micro-Control Unit (MCU), which is a microchip device that incorporates a processor serving as a programmable central processing unit (CPU) as well as one or more of memories. The MCU may be thought of as a small computer or computer like device formed on a single chip.

Although not shown, each of the system elements that uses power to operate as described will include a power supply circuit and will connect to or possibly contain a power source. The luminaires 11A and 11B and the BAC appliances 71A and 71B may draw power from an AC grid/mains or from a DC grid. The luminaires 11A and 11B and the BAC appliances 71A and 71B, for example, may draw power from alternating current (AC) mains in the building or other type of premises where the system 10 may be installed. In an AC grid type example, the power supply circuit of a particular luminaire 11A or 11B or BAC appliances 71A or 71B will include a driver circuit to process power drawn from the AC mains in any manner as may be appropriate to drive the particular type of light source or mechanical component or the like of the respective BAC appliance. The source driver, for example, may be a simple switch connected to power and controlled by the processor, for example, if the light source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processor, memory and interface) serving as the device intelligence and for the communication interface.

In the example, the power supply circuit for each luminaire receives electricity from AC mains, however, one or more of the system elements for each service area may be driven by a battery or other power source for a particular application. For example, one or more luminaires in each room and one or more luminaires in a corridor each may have or connect to a back-up battery or other back-up power source to supply power for some period of time in the event of an interruption of power from the AC mains. Other system elements in each service area, such as lighting controllers or other user interface devices and/or any stand-alone sensors would likewise include appropriate power supply circuits, which may rely on AC or DC power from the mains, battery power and/or ambient power harvesting, etc.

As noted, system elements within a room or other service area are coupled via suitable links for network data communications, as represented generally by the network clouds 17A and 17B, and the various communication interfaces are compatible with those links. The system 10 also includes communication links coupling the first and second physical networks into a wider area network. The local service area networks 17A, 17B may be relatively distinct from each other and distinct from but coupled to a wider area network as shown generally at 51, or the networks may be relatively unified. Various network media and protocols may be used for the data communications. The networks 17A and 17B allow elements within respective service areas A and B to communicate with each other as may be appropriate for their operations, and the links or couplings 49A, 49B of those networks to the wider area network 51 allow the elements within each of the service areas to communicate with elements in other service areas and/or to communicate with other devices, for example, by the server/host computer or the like operating as the physical type of gateway 100g.

The wider area network 51 at the premises also allows the elements within each of the service areas and/or the gateway 100g to communicate via an external wide area data communication network 52, such as the public Internet, e.g. with external servers such as 57 and/or with user terminal devices 55. Alternatively, the user terminal devices 55 may be located at the premises 12 and use the on premise network facilities 51, 17A, 17B.

For a cloud service implementation of the gateway functionality 100c, the wider area network 51 allows the elements within each of the service areas to communicate with the cloud based implementation of the software architecture 117. In either case, the gateway 100g, 100c and its software architecture 117 communicate with the luminaires, other lighting elements (lighting controllers and lighting related sensors) and the BAC appliances throughout the premises to implement the integrated lighting and building management control, as discussed above.

The user terminal equipment such as that shown at 55 may be implemented with any suitable processing device that can communicate and offer a suitable user interface. The terminal 55, for example, is shown as a desktop computer with a wired link into the Internet or the like 52 or into the network 51 at the premises. However, other terminal types, such as laptop computers, notebook computers, netbook computers, tablet computers and smartphones may serve as the user terminal computers. Also, although shown as communicating via a wired link from the network 51 or the network 52, such a device may also or alternatively use wireless or optical media; and such a device may be operated at the premises 12 and utilize the same networking media 17A or 17B utilized by the on-premises system elements. Of particular note, these communication capabilities enable the user terminal 55 to communicate with the gateway functionality 100g, 100c, to view available lighting and building management and perform control interactions, via the integrated user interface offered by the visualization software platform 140 as described herein.

Figure 4:
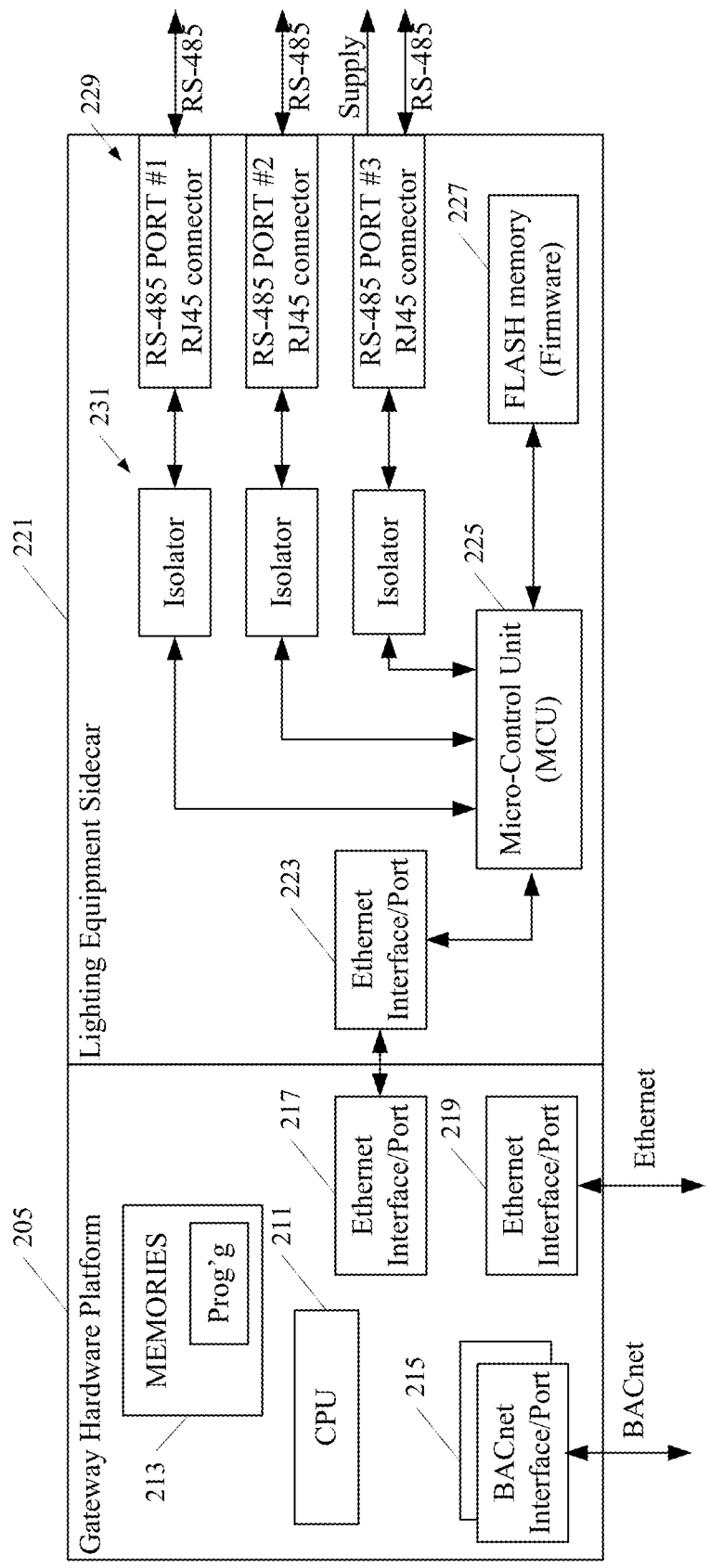
FIG. 4 is a more specific example of hardware which may be used for a gateway implementation, with interfaces to different lighting and building management control networks as well as intelligence for execution of the software architecture for the integrated lighting and building management control.

The hardware for the computing element may be implemented in a variety of ways at various on or off-premises locations and/or in the cloud. In an application for control of the various building management and lighting functions at a particular premises, the computing element may be implemented as a physical gateway hardware device. Where the lighting elements utilize a unique network media and protocol, it may be effective to add a hardware module to the gateway hardware to provide the relevant connectivity. For such an implementation, FIG. 4 is a more specific example of hardware platform which may be used for an on-premises or near-premises gateway implementation, with interfaces to different lighting and building management control networks as well as intelligence for execution of the software architecture 117 for the integrated lighting and building management control. In that example, the equipment includes a gateway hardware platform 205 and an associated lighting equipment interface module referred to as a sidecar 221.

The intelligence of the gateway hardware platform 205 in this example relies on one or more processors 211 acting as a central processing unit (CPU) of the hardware platform 205. Software, including the software architecture 117 programming for implementing integrated lighting control and building management control, any other programming for the gateway, as well as data processed by or to be supplied to/from the CPU of processor(s) 211, is stored in appropriate storage devices, represented in the examples by memories 213. Such programming enables the platform to provide the integrated monitoring and control functions and the integrated user interface, as discussed in detail above.

The gateway hardware platform 205 in the example includes several network interfaces 215, 217, 219. In this example, the network interface 215 is a BACnet interface that provides the gateway platform 205 communication coupling/connection for communication to and from the BAC appliances. Additional BACnet interfaces and/or alternative types of building management interfaces may be provided, to support expected volumes of building management communication traffic and/or to communicate with other building equipment that uses other media or protocols. In this example, the network interfaces 217 and 219 are Ethernet type interfaces. The Ethernet interface 217 in the example is an electrical coupling interface or port providing hardwire connections to a compatible Ethernet interface port 223 in the lighting equipment sidecar 221. Additional Ethernet interfaces like 217 may connect to additional sidecars or other peripheral modules adjacent to or for wired communication with the platform 205. The other Ethernet type network interface 219 may be wired or wireless (e.g. WiFi), for example, to provide communication coupling/connection for communication to and from user terminals or any other equipment that may use monitoring data or send control commands to or through the gateway. This later type of communication may also include communication with a network extending off-premises, e.g. a private wide area intranet or to the public Internet.

In the example, to provide interfacing for communication with the lighting elements, the hardware includes a sidecar 221, having the Ethernet interface port 223 connected to the Ethernet interface port 217 of the gateway hardware platform 205. Although the drawing shows only one sidecar coupled to the gateway hardware platform 205, a gateway hardware platform 205 may have additional sidecars.

In the example, the intelligence of the sidecar 221 is implemented using a Micro-Control Unit (MCU) 225, which is a microchip device that incorporates a processor serving as the programmable central processing unit (CPU) as well as one or more of memories storing at least some of the programming and/or data for the processor. The MCU 225 may be thought of as a small computer or computer like device formed on a single chip. Such devices are often used as the configurable control elements embedded in special purpose devices rather than in a computer or other general purpose device. The sidecar 221 in the example also includes a flash memory 227 connected to the MCU 227. Flash memory 227 additional programming and/or date, e.g. the firmware of the sidecar 221. Those skilled in the art will appreciate that other processor and memory architectures may be used.

The sidecar 221 supports communications with luminaires and various other lighting related elements, such as wallswitches, sensors (e.g. occupancy and/or ambient light), control panels, etc. For this purpose the sidecar 221 will include one or more communication interfaces compatible with the media and protocol(s) used by the luminaires and other lighting related elements. The sidecar 221 may have a number of different interfaces to communicate with lighting equipment configured for different media and/or different protocols. The sidecar 221 will have one, two or more such interfaces to support communications for lighting-related monitoring of an intended number of lighting related elements to be monitored and controlled, e.g. at a particular premises and/or by the particular gateway hardware platform 205.

The illustrated example represents a configuration for communication with nLight® enabled lighting elements, which communicate via RS-485 network links over RJ45 wiring. For communication with such elements, the sidecar 221 in the example includes several RS-485 ports 229 with RJ45 connectors. One or more of RS-485 ports 229 may also supply power for some of the lighting elements. Each RS-485 port 229 communicates with the MCU 231 of the sidecar via an isolator 225. Although the example in the drawing includes interface ports 229 for particular wired communications links, it should be understood that interfaces for other types of wired or wireless links may be used in addition to or in place of one or more of the interface ports 229.

Those skilled in the art will understand that the sidecar may be implemented in other ways, or some or all of the appropriate interfaces of the sidecar and associated programming may be incorporated into the gateway hardware platform 205.

Figure 5:
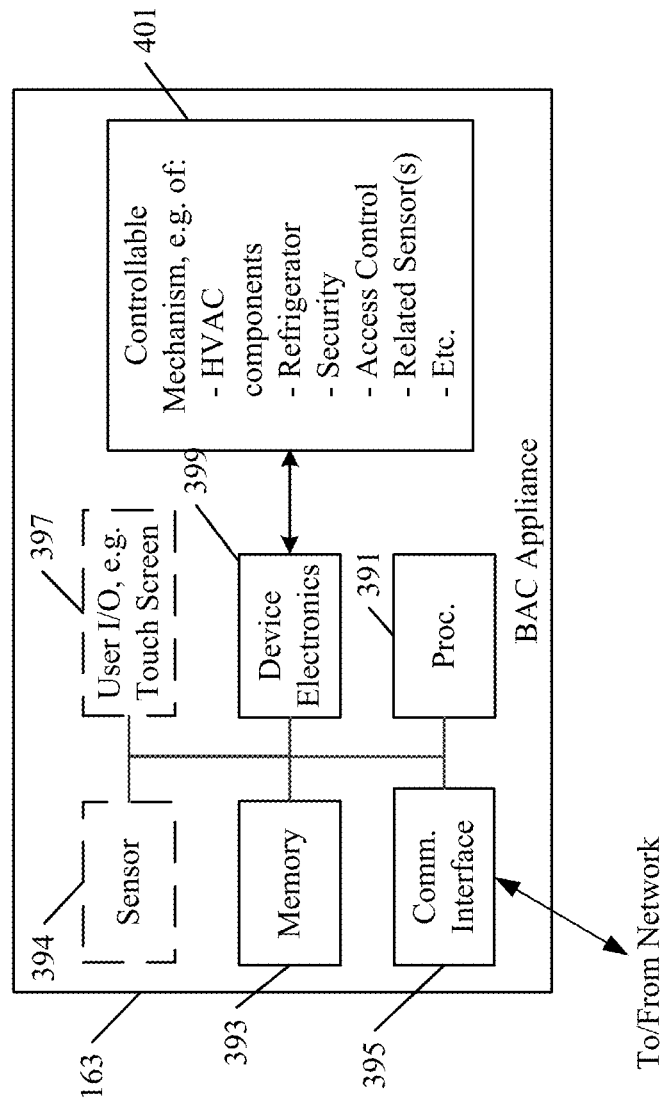
FIG. 5 is a functional block diagram of an example of an intelligent building automation control (BAC) capable appliance.

Appliances suitable for building management control as discussed above may be any of a variety of different types of devices and/or built in different ways, to achieve diverse intended purposes yet communication with the BMS application. It may be helpful to consider a high level example. FIG. 5 is a functional block diagram of an example of an intelligent building management element, such as one of the BAC appliances 163 shown in FIG. 2. The BAC appliance 163 is an intelligent device in that the BAC appliance 163 includes a processor 391 and a memory 393 and program in the memory 393 for execution by processor 391 to implement the intended functions of the applicant 163. This 'brain' of the BAC appliance 163 will be coupled to and control appropriate device drive electronics 399. The drive electronics 399 provide an interface to a controllable mechanism 401 of the particular BAC appliance 163, to allow the processor 391 to control the mechanism, or to receive sensor data from the mechanism or both. The drive electronics 399 and the programming (e.g. stored in memory 393) that is run by the processor 391 to control operation of each particular BAC appliance 163 will depend on the particular type device used as the mechanism 401 and thus on the particular type of building management BAC appliance product that the arrangement 163 represents or implements.

The examples of BAC appliance 163 may be virtually any type of device, which may utilize data communications, in this case, via the elements and network of the system 10 of FIG. 3, BMS application 139 of FIGS. 1 and 2. By way of a few examples, the controllable mechanism 401 may be any of a variety of HVAC components (e.g. elements of a thermostat, one or more elements of the heat/cooling system, controllable vents or dampers within the duct work), one or more cooling or other elements of a refrigerator, any of a variety of components of a security system, any of a variety of access control elements, and/or sensors related to any or all of the above functions.

The building management BAC appliance 163 also includes a communication interface 395. Like the communication interfaces in the other intelligent system elements (FIG. 3), the interface 395 connects or otherwise couples to the network media in the service area and supports two-way data communication through the network(s) 17A-17C and/or 51 of the system 10. Although not shown, the BAC appliance 163 may have more than one communication interface, for example one for a wired or optical fiber medium and another for optical or radio frequency wireless communication.

In the example of FIG. 5, the BAC appliance 163 is shown as having one processor 391, for convenience. In many instances, these elements may have multiple processors. For example, a particular configuration for an BAC appliance 163 may utilize a multi-core processor architecture. Also, some of the other components, such as the communications interfaces, may themselves include processors. Alternatively, the BAC appliance 163 may use a Micro-Control Unit (MCU) 121, which is a microchip device that incorporates a processor serving as the programmable central processing unit (CPU) as well as one or more of memories 393. The MCU 121 may be thought of as a small computer or computer like device formed on a single chip.

A BAC appliance 163 may include one or more input and/or output (I/O) elements 397 for a user interface (instead of or in addition to the mechanism 401). The user I/O element 397, for example, may include a toggle switch, a rotary controller, one or more sliders, a keypad and/or a touchscreen display. The precise user I/O element, if provided, depends on the operational characteristics of the particular BAC appliance 163. For example, for an HVAC controller, the user I/O element(s) 397 might be similar to those of a digital thermostat. A touchscreen display, as another example, may support touch and touch gesture input as well as visual display output. Other examples of the UI input may include a video input and associated processing for gestural control detection, a microphone, an occupancy/motion sensor, proximity sensor, etc. If provided, outputs may be visual, audible, tactile, etc. For example, a microphone and/or speaker may be used to support audible input and/or output, whereas a camera in combination with projector or display may be used to support visual input and/or output.

As an alternative or in addition to any sensors included in the controllable mechanism 401, a BAC appliance 163 may include one or more sensors 394 (instead of or in addition to the mechanism 401). If included, the type of sensor in a particular BAC appliance 163 would depend on the type of element and/or the mechanism 401 that the 'brain' controls either within the appliance itself or in same or another appliance via the BMS application 139.

As shown by the above discussion, functions relating to the integrated lighting and building management control may be implemented on computers connected for data communication via the components of a data communication network, operating as one or more network connected hardware elements in the cloud or as the computing element of an actual gateway as shown in FIG. 1 and/or FIG. 3. Although special purpose devices may be used, such devices also may be implemented using one or more hardware platforms intended to represent a general class of data processing device, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The integrated lighting and building management control functionalities involve programming, including executable code of the software architecture, as well as associated stored data, e.g. the files or other data used or processed during execution of the software architecture. The software code is executable by the general-purpose computer that functions as an actual or physical gateway device and/or one or more general-purpose computers that implement the gateway functions in the cloud. In operation, the code is stored within the general-purpose computer platform. At other times, however, the software architecture and/or any associated files or other data may be stored at other locations and/or transported for loading into the appropriate general-purpose computer system. Execution of such code by a processor of the computer platform enables the platform to implement the methodology or functionalities for the integrated implementation of lighting control and building management control, in essentially the manner performed in the implementations discussed and illustrated herein.

Figure 7:
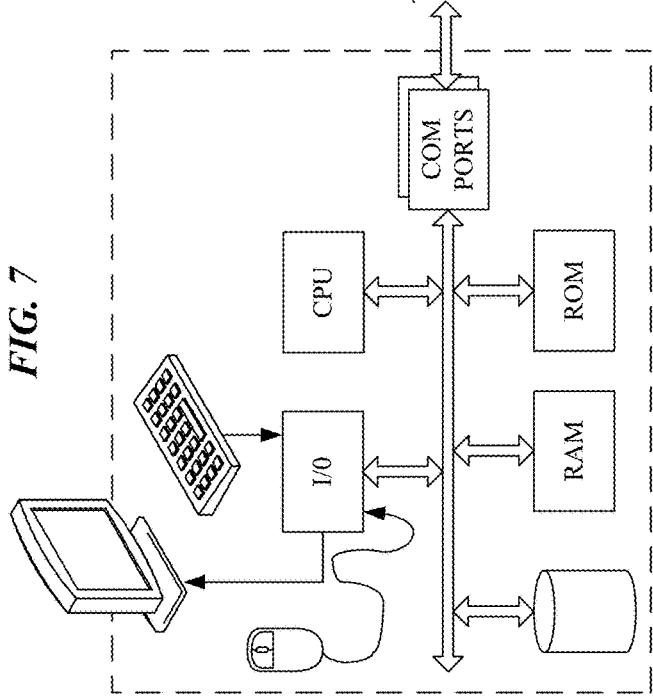
FIG. 7 is a simplified functional block diagram of a personal computer or other work station or terminal device, for possible communication with the gateway or cloud implementation of the integrated lighting and building management control system.
Figure 6:
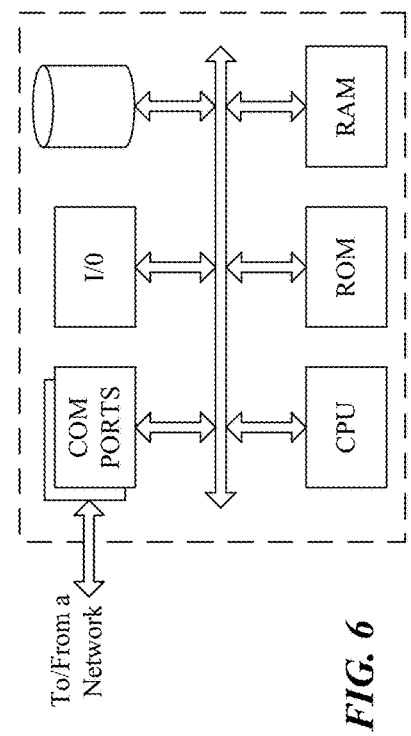
FIG. 6 is a simplified functional block diagram of a computer that may be configured as a host or server, for example, to function as the gateway or as an outside/cloud server in the system of FIG. 3.

FIGS. 6 and 7 provide functional block diagram illustrations of general purpose computer hardware platforms. FIG. 6 illustrates a network or host computer platform, as may typically be used to implement a server, gateway or cloud computing platform. FIG. 7 depicts a computer with user interface elements, as may be used to implement a personal computer or other type of work station or terminal device, although the computer of FIG. 7 may also act as a server, gateway, host computer, etc. if appropriately programmed. It is believed that those skilled in the art are familiar with the structure, programming and general operation of such computer equipment and as a result the drawings should be self-explanatory.

A network computer, for example (FIG. 6), includes a data communication interface for packet data communication. That computer element also includes a central processing unit (CPU), in the form of one or more processors, for executing program instructions. The network computer platform typically includes an internal communication bus, program storage and data storage for various data files to be processed and/or communicated by the server or gateway functions, although the network computer element often receives programming and data via network communications. The hardware elements, operating systems and programming languages of such computers are conventional in nature, and it is presumed that those skilled in the art are adequately familiar therewith. Of course, the functions relating to the integrated lighting and building management control, implemented via the software architecture, may be implemented in a distributed fashion on a number of similar network computer hardware platforms, to distribute the processing load and/or offer the gateway functionalities as a cloud service.

Figure 8:
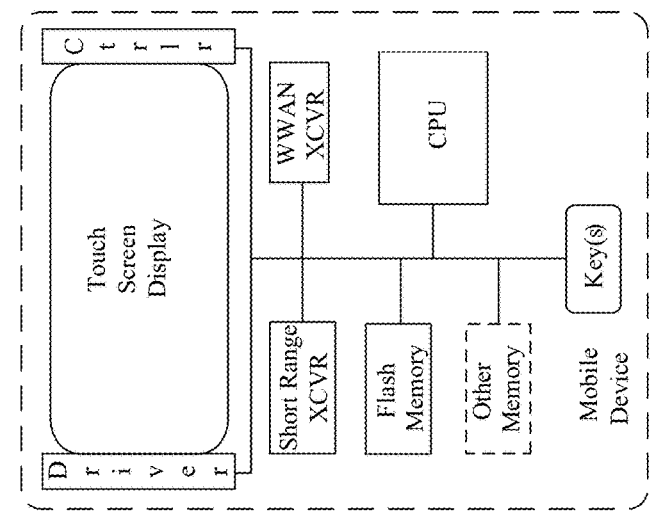
FIG. 8 is a simplified functional block diagram of a mobile device, e.g. smartphone or tablet, as an alternate example of a user terminal device, for possible communication with the gateway or cloud implementation of the integrated lighting and building management control system.

A computer type user terminal device, such as a PC or tablet computer, similarly includes a data communication interface CPU, main memory and one or more mass storage devices for storing user data and the various executable programs (see FIG. 7). A mobile device type user terminal (FIG. 8) may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the functionalities for the integrated lighting control and building management control outlined above may be embodied in programming for the software architecture (see e.g. FIG. 1). Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a manufacturer or control service provider into the computing element that will run the integrated software architecture. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A building management and lighting system, comprising;
   building automation control (BAC) appliances configured to implement a plurality of controllable operations within a premises and their related status reporting, the BAC appliances including interfaces for network communications;
   luminaires including artificial illumination light sources;
   processors and interfaces for network communications, in or associated with luminaires, and configured to operate the luminaires to implement controllable general illumination within the premises and related lighting status reporting;
   a computing element, including a central processing unit and an interface for network communications with the BAC appliances and with the processors in or associated with the luminaires; and
   a software architecture for execution by the central processing unit of the computing element to implement integrated lighting control and building management control, the software architecture comprising:
      a building management system (BMS) application, the BMS application being configured to support network communications with BAC appliances within the premises, to monitor and/or control the BAC appliances;
      a lighting control application configured to support network communications with the processors in or associated with the luminaires within the premises, to monitor and control the luminaires;
      a broker implementing a publish-and-subscribe communication protocol;
      a visualization software platform configured to publish and subscribe via the broker;
      a first client, associated with the BMS application, configured to support publish-and-subscribe communications of the BMS application with the broker; and
      a second client, associated with the lighting control application, configured to support publish-and-subscribe communications of the lighting control application with the broker, wherein:
         the BMS application and/or the visualization software platform is configured to publish lighting related override commands via the first client and the broker and to subscribe to lighting related status messages via the first client and the broker;
         the lighting control application is configured to publish the lighting related status messages based on the monitoring of the luminaires within the premises via the second client and the broker and to subscribe to the lighting related override commands via second client and the broker; and
         the visualization software platform is further configured to provide an integrated user interface via network communication of the computing element with a user terminal device, the integrated user interface offering the user:
            1) an integrated view of status of the BAC appliances and the luminaires or other related lighting elements within the premises, and
            2) integrated access to control operations of the BAC appliances and the luminaires or other related lighting elements within the premises.

2. The system of claim 1, wherein the software architecture configures the computing element as a gateway at the premises.

3. The system of claim 1, wherein the software architecture is configured for execution in a cloud configuration.

4. The system of claim 1, wherein the broker, the clients and the visualization software platform are configured to communicate via Message Queue Telemetry Transport (MQTT) protocol.

5. The system of claim 1, wherein the visualization software platform is a component of the BMS application.

6. The system of claim 1, wherein:
the software architecture further comprises an application framework configured to execute via an operating system of the computing element;
at least the BMS application is configured to execute via the application framework on the operating system of the computing element; and
the visualization software platform is a component of the application framework.

7. The system of claim 1, wherein the software architecture further comprises:
a Linux kernel for execution on a processor of the computing element;
an Android runtime environment for execution via the Linux kernel; and
an application framework, wherein:
a) the BMS application is configured to execute via the application framework on the Android runtime environment; and
b) the lighting control application is configured to execute via the Linux kernel.

8. An article of manufacture, comprising:
a software architecture for execution on a computing element to implement integrated lighting control and building management control, the software architecture including:
a building management system (BMS) application, the BMS application being configured to support network communications with building automation control (BAC) appliances within a premises, to monitor and/or control the BAC appliances;
a lighting control application configured to support network communications with processors controlling light sources of luminaires and/or with other lighting related elements within the premises, to monitor and control the luminaires and to monitor the other lighting related elements;
a broker implementing a publish-and-subscribe communication protocol;
a visualization software platform configured to publish and subscribe via the broker;
a first client, associated with the BMS application, configured to support publish-and-subscribe communications of the BMS application with the broker; and
a second client, associated with the lighting control application, configured to support publish-and-subscribe communications of the lighting control application with the broker, wherein:
the BMS application and/or the visualization software platform is configured to publish lighting related override commands via the first client and the broker and to subscribe to lighting related status messages via the first client and the broker; and
the lighting control application is configured to publish the lighting related status messages based on the monitoring of the luminaires and other lighting related elements within the premises via the second client and the broker and to subscribe to the lighting related override commands via the second client and the broker; and
the visualization software platform is further configured provide an integrated user interface via network communication of the computing element with a user terminal device, the integrated user interface offering the user:
1) an integrated view of status of the BAC appliances and the luminaires within the premises, and
2) integrated access to control operations of the BAC appliances and the luminaires within the premises; and
a non-transitory machine readable medium bearing the software architecture.

9. The article of manufacture of claim 8, wherein the software architecture is configured for execution on a network connected implementation of the computer element acting as a gateway to the BAC appliances as well as to the luminaires within the premises.

10. The article of manufacture of claim 8, wherein the software architecture is configured for execution in a cloud configuration.

11. The article of manufacture of claim 8, wherein the broker, the clients and the visualization software platform are configured to communicate via Message Queue Telemetry Transport (MQTT) protocol.

12. The article of manufacture of claim 8, wherein the visualization software platform is a component of the BMS application.

13. The article of manufacture of claim 8, wherein:
the software architecture further comprises an application framework configured to execute via an operating system of the computing element;
at least the BMS application is configured to execute via the application framework on the operating system of the computing element; and
the visualization software platform is a component of the application framework.

14. The article of manufacture of claim 8, wherein the software architecture further comprises:
a Linux kernel for execution on a processor of the computing element;
an Android runtime environment for execution via the Linux kernel; and
an application framework, wherein:
a) the BMS application is configured to execute via the application framework on the Android runtime environment; and
b) the lighting control application is configured to execute via the Linux kernel.

15. An article of manufacture, comprising:
a software architecture for execution on a computing element to implement integrated lighting control and building management control, the software architecture including:
a building management system (BMS) application, the BMS application being configured to support network communications with building automation control (BAC) appliances within a premises, to monitor and/or control the BAC appliances;

a lighting control application configured to support network communications with processors controlling light sources of luminaires and/or with other lighting related elements within the premises, to monitor and control the luminaires and to monitor the other lighting related elements;

a broker implementing a publish-and-subscribe communication protocol;

a visualization software platform configured to publish and subscribe via the broker;

a first client, associated with the BMS application, configured to support publish-and-subscribe communications of the BMS application with the broker; and a second client, associated with the lighting control application, configured to support publish-and-subscribe communications of the lighting control application with the broker, wherein:

the lighting control application and/or the visualization software platform is configured to subscribe to BMS related status messages and publish BMS related commands via the broker; and the BMS application is configured to publish the BMS related status messages based on the monitoring of the BAC appliances within the premises via the first client and the broker and to subscribe to the BMS related commands via the first client and the broker; and the visualization software platform is further configured provide an integrated user interface via network communication of the computing element with a user terminal device, the integrated user interface offering the user:

1) an integrated view of status of the BAC appliances and the luminaires within the premises, and 2) integrated access to control operations of the BAC appliances and the luminaires within the premises; and a non-transitory machine readable medium bearing the software architecture.

16. The article of manufacture of claim 15, wherein the software architecture is configured for execution on a network connected implementation of the computer element acting as a gateway to the BAC appliances as well as to the luminaires within the premises.

17. The article of manufacture of claim 15, wherein the software architecture is configured for execution in a cloud configuration.

18. The article of manufacture of claim 15, wherein the visualization software platform is a component of the BMS application.

19. The article of manufacture of claim 15, wherein:

the software architecture further comprises an application framework configured to execute via an operating system of the computing element;

at least the BMS application is configured to execute via the application framework on the operating system of the computing element; and the visualization software platform is a component of the application framework.

* * * * *